Figure 1:
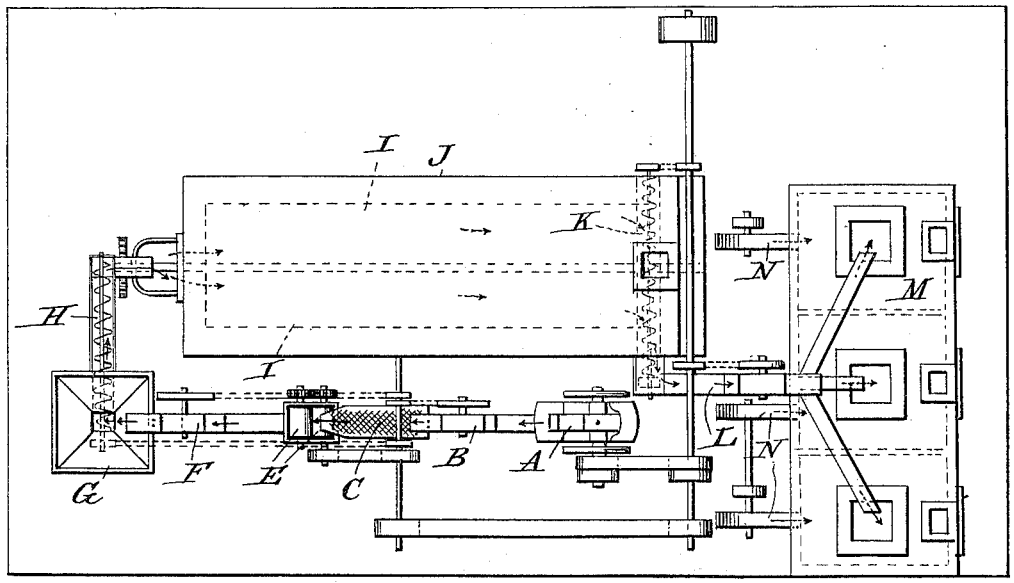

No. 674,760. Patented May 21, 1901.
A. E. CUMMER.
PROCESS OF TREATING HYDROUS COMPOUNDS.
(Application filed Feb. 18, 1901.)

(No Model.)

WITNESSES:

INVENTOR
Albert E. Cummer
BY Grant Burroughs
Attorney

UNITED STATES PATENT OFFICE.

ALBERT E. CUMMER, OF CLEVELAND, OHIO.

PROCESS OF TREATING HYDROUS COMPOUNDS.

SPECIFICATION forming part of Letters Patent No. 674,760, dated May 21, 1901.

Application filed February 18, 1901. Serial No. 47,813. (No specimens.)

*To all whom it may concern:*

Be it known that I, ALBERT E. CUMMER, a citizen of the United States, and a resident of Cleveland, in the county of Cuyahoga and State of Ohio, have invented certain new and useful Improvements in the Process of Treating Hydrous Compounds in the Production of Plaster and Analogous Substances, of which the following is a full, clear, and exact description, such as will enable those skilled in the art to which it appertains to use and practice the same, reference being had to the accompanying drawings, forming a part of this specification.

This invention relates to improvements in the process of treating hydrous compounds to dehydrate or calcine the same in the production of plaster and analogous substances, and more particularly it relates to the process of treating gypsum in the production of such substances.

In the invention in the present instance the raw material is subjected to the action of the extraneous heat until dehydration has commenced and has progressed to a comparatively small degree, when it is removed from such action and the process completed by its resident heat. As the raw material is subjected to the action of the extraneous heat but a comparatively short time and only until the dehydration has commenced, the liability of its becoming overheated and injured is reduced to a minimum, and as the amount of heat imparted to the material is limited by the extent of the exposure to the action of the extraneous heat (which time is under the operator's control) the liability is also likewise limited of the temperature of the resident heat becoming so high as to injure the product after its removal from the action of the extraneous heat. By utilizing the resident heat in this way the time of exposure of the material under treatment to the action of the extraneous heat is much shortened. This is a very important consideration, and especially so where the process is a continuous one, as the material can be handled much more quickly and economically and the output of a plant thereby increased. Also a much better product is obtained.

The invention in the present instance consists, primarily, in subjecting the material to be treated to the action of extraneous heat until the dehydration is commenced and has progressed to a comparatively small degree and then removing it from such action and completing the dehydration by the resident heat of the material.

The invention also consists in the additional features hereinafter particularly pointed out.

In carrying out the invention gypsum or hydrous calcium sulfate is comminuted to such a degree that its largest particles will be about the size of, say, hickory-nuts. The material so divided is then subjected to the action of extraneous heat produced by a suitable generator until it reaches the temperature of about 300° Fahrenheit, during which period the dehydration has commenced and has been partially completed. The material is then removed from the action of the extraneous heat and is placed in an inclosure, where the dehydration is finished by the resident heat of the material. After the completion of the process of dehydration the resultant product may be subjected to the action of air under pressure to be cooled.

Figure 2:
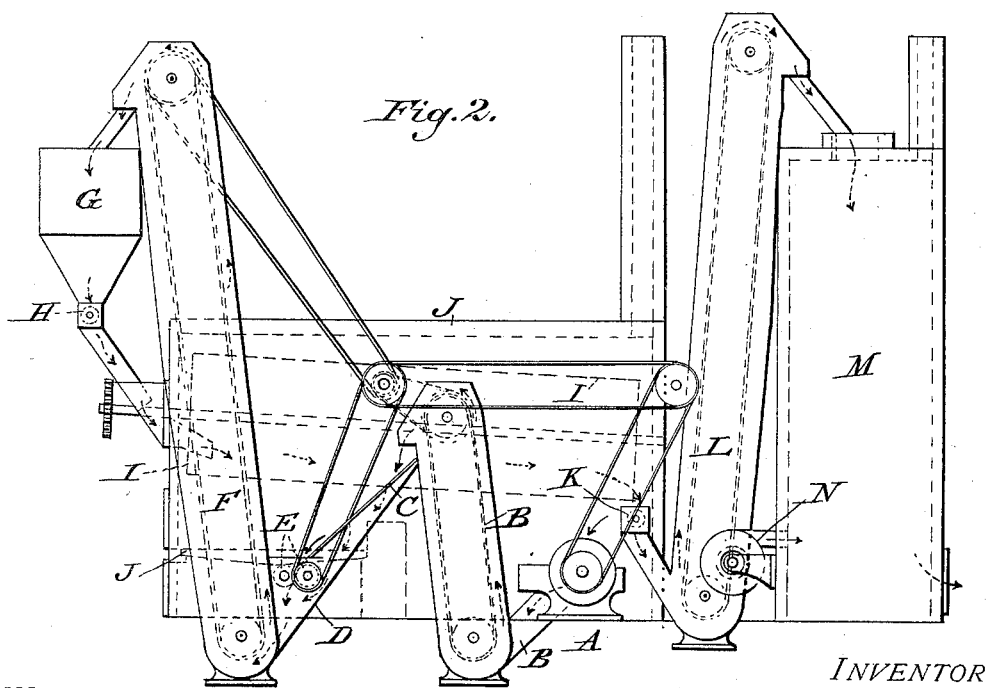

In the drawings, which show an apparatus for carrying out the invention and in which similar reference characters designate corresponding parts, Figure 1 is a plan view. Fig. 2 is a side elevation.

As the apparatus shown in the drawings forms no part of the present invention, the details of its construction have not been shown and the features that are shown have been conventionalized to a considerable degree.

The several parts of the apparatus may be of any construction suitable in the premises. The crusher A is connected by the conveyer B with the screen C. Beneath the latter is a receptacle D, and adjacent to its lower end and above the receptacle are the auxiliary crushing-rolls E. From the receptacle D the conveyer F leads to the hopper G, from the lower end of which the screw conveyer H leads to a spout entering the upper end of the inclined rotary drum I, mounted in the furnace J. From the lower end of the drum conveyers K and L lead to the closures or bins M. With the latter blowers N are connected. The openings of the bins are provided with suitable covers.

In carrying out the process with the apparatus the raw material is fed into the crusher A, where it is broken into small particles. The material so broken is carried from the crusher by the conveyer B and deposited upon the upper end of the inclined screen C. The reticulations of the latter are such that all particles of about the size of a hickory-nut and smaller will pass through the same and fall into receptacle D. The larger particles, that cannot pass through the screen, are fed between the auxiliary crushing-rolls E and are reduced to the same size as those that have passed through the screen and are gathered in the receptacle D. The material thus comminuted is then carried by the conveyer F into the hopper G, from which it is fed by the screw conveyer into the hopper G, from which it is fed by the screw conveyer into the rotary drum I, located in the furnace J. While in the drum the comminuted material is partially dehydrated, and when it leaves the drum it has a temperature of about 300° Fahrenheit. The material so treated is then carried by the conveyers K and L to one of the closures or bins M, where it is substantially excluded from the air to retain its heat and the dehydration is completed by the resident heat of the material. While the use of the inclosure is preferable, yet it may be dispensed with and the material deposited in a pile open to the air. In the latter case the dehydration will be completed almost as quickly as the outer layer of material will form a closure sufficient to retain the heat in the pile; but this outer layer of material will be spoiled. With the use of the closure, however, it may be saved.

It is to be observed that the dehydration is not carried out to the extent of driving off all the water of crystallization. If all the water should be driven off, the plaster would become overburned and practically useless, for when so treated the product rehydrates only with great difficulty. In carrying out the present process about five per cent. of the water of crystallization is left in the product.

The use of the three closures or bins independent of each other is advantageous, inasmuch as the operation can be carried on continuously. While one closure is being filled the material in the one previously filled can be undergoing the completion of the process, and from the third one, which was filled first of all, the new product can be withdrawn for use.

In case the resultant product should not cool quickly enough after the completion of the dehydration, air under pressure can be introduced into the closures by means of the blowers N and can pass off through suitable openings made for the purpose.

Having thus described my invention, what I claim, and desire to secure by Letters Patent, is—

1. The process of treating hydrous compounds to dehydrate the same consisting in heating the raw material until dehydration has commenced and has been partially completed, and then completing the dehydration by the resident heat of the material.

2. The process of treating hydrous compounds to dehydrate the same consisting in heating the raw material until dehydration has commenced and has been partially completed, and then completing the dehydration by the resident heat of the material substantially out of contact with the air.

3. The process of treating hydrous compounds to dehydrate the same consisting in subjecting the raw material to the action of extraneous heat until dehydration has commenced and has been partially completed, and then removing the material so treated from the action of the extraneous heat and completing the dehydration by the resident heat of the material.

4. The process of treating hydrous compounds to dehydrate the same consisting in subjecting the raw material to the action of extraneous heat until dehydration has commenced and has been partially completed, and then removing the material so treated from the action of the extraneous heat and completing the dehydration by the resident heat of the material substantially out of contact with the air.

5. The process of treating hydrous compounds to dehydrate the same consisting in subjecting the raw material to the action of extraneous heat until dehydration has commenced and has been partially completed, then removing the material so treated from the action of the extraneous heat and completing the dehydration by the resident heat of the material substantially out of contact with the air, and after the completion of the dehydration subjecting the resultant product to the action of air under pressure for cooling the same.

In testimony whereof I hereunto affix my signature in the presence of two witnesses.

ALBERT E. CUMMER.

Witnesses:
W. M. CUMMER,
MARY T. SINNOTT.